(12) United States Patent
Iwasaki

(10) Patent No.: US 7,424,247 B2
(45) Date of Patent: Sep. 9, 2008

(54) IMAGE FORMING APPARATUS HAVING A SEPARABLE COUPLING SET

(75) Inventor: Takahiro Iwasaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 278 days.

(21) Appl. No.: 11/283,696

(22) Filed: Nov. 22, 2005

(65) Prior Publication Data

US 2006/0222405 A1 Oct. 5, 2006

(30) Foreign Application Priority Data

Mar. 31, 2005 (JP) ............................ 2005-100451

(51) Int. Cl.
*G03G 15/00* (2006.01)
(52) U.S. Cl. .................. 399/117; 399/159; 399/167
(58) Field of Classification Search ................ 399/111, 399/117, 159, 167, 299, 302
See application file for complete search history.

(56) References Cited

U.S. PATENT DOCUMENTS

| | | | | |
|---|---|---|---|---|
| 6,671,475 B2 * | 12/2003 | Katada et al. | ................ | 399/111 |
| 7,155,145 B2 * | 12/2006 | Iwasaki et al. | ............... | 399/167 |
| 7,236,722 B2 * | 6/2007 | Portig | ......................... | 399/167 |
| 7,272,345 B2 * | 9/2007 | Kim et al. | .................... | 399/167 |
| 2002/0085858 A1 | 7/2002 | Yamaguchi et al. | | |

FOREIGN PATENT DOCUMENTS

| | | |
|---|---|---|
| JP | 11-143339 | 5/1999 |
| JP | 2000-055070 | 2/2000 |
| JP | 2000-112194 | 4/2000 |
| JP | 2002-258675 | 9/2002 |
| JP | 2005-062806 | 3/2005 |
| JP | 2005062806 | 3/2005 |

OTHER PUBLICATIONS

European Search Report dated Jun. 28, 2006 (EP 05 11 1086) (3 pages).
Office Action mailed May 27, 2008 in Japanese Patent Application No. 2005-100451, filed Mar. 31, 2005.

* cited by examiner

*Primary Examiner*—William J Royer
(74) *Attorney, Agent, or Firm*—Finnegan, Henderson, Farabow, Garrett & Dunner, L.L.P.

(57) ABSTRACT

An image forming apparatus includes: an image carrier rotated by a drive section and carrying a toner image to transfer onto a transfer medium; and a drive-side coupling and an image carrier-side coupling capable of being connected to and being separated from each other by relative movement in a direction of a rotary shaft of the drive section and capable of connecting and separating the drive section and the image carrier. The drive-side coupling has a plurality of abutting surfaces for transmitting a driving force, the image carrier-side coupling has a plurality of abutting surfaces to which the driving force is transmitted, and the drive-side coupling and the image carrier-side coupling have a difference in angles of each of the abutting surfaces of the couplings with respect to a direction in which the couplings are connected to and separated from each other.

6 Claims, 9 Drawing Sheets

US 7,424,247 B2

IMAGE FORMING APPARATUS HAVING A SEPARABLE COUPLING SET

This application is based on Japanese Patent Application No. 2005-100451 filed on Mar. 31, 2005, which is incorporated herein by reference in its entirety.

BACKGROUND OF THE INVENTION

The present invention relates to a technology that prevents rotation irregularities of an image carrier in an image forming apparatus and to a technology that prevents color registration failure when toner images of respective colors formed on a plurality of image carriers are transferred onto a medium to be transferred, such as an intermediate transfer body in a color image forming apparatus.

The color image forming apparatus, which has the image carriers for respective primary colors yellow (Y), magenta (M), cyan (C), and black (K), forms toner images of the colors on the image carriers respectively, superimposes the formed toner images on an intermediate transfer body, and transfers the toner image with the four colors superimposed thereon on a transfer paper to form a color image.

The image carriers respectively configure image forming sections each equipped with an electrostatic charger, a developing device, a transfer device, a cleaning device and other related components, and the image forming sections of the respective colors and the intermediate transfer body are integrally formed to configure a process cartridge. This process cartridge can be pulled out from a main body of the image forming apparatus, and each of the image carrier units and developing devices and the like are configured to be able to be attached and separated relative to the process cartridge in the state in which the process cartridge is pulled out.

The toner images of the respective colors formed in the image forming sections of the respective colors are sequentially transferred onto the rotating intermediate transfer body by the transfer devices to form a synthesized color image. Creating a color image without color registration failure requires the toner images to be sequentially matched to the previous toner image and superimposed on the next toner image.

Because of the object as described above, the linear velocities of the image carriers and the medium to be transferred, such as the intermediate transfer body, need to be identical to each other with a high degree of precision. A difference in the linear velocities will cause color registration failure or image registration failure.

Driving of the image carriers is given by drive units provided in each of the image carriers. The drive unit transmits rotation which has been slowed down via a plurality of gears from a main motor to a rotary shaft. The rotary shaft can be inserted and removed through the cylindrical image carrier and is supported by a shaft bearing in the opposite side to rotate the image carrier.

The image carrier, which receives the rotation from the main motor via a gear train constituted by the plurality of gears as described above and is required for precision in all of the gears, generates slight rotation irregularities due to the influence of tolerances accumulated in each of the gears. Also, the intermediate transfer body has rotation irregularities because it is driven by the similar drive section. Thus, even though the linear velocities of the image carrier and the intermediate transfer body are matched, when the rotation irregularities occur in either, the other cannot follow the former, resulting in a blurred image.

On the other hand, in Patent Document 1 (Japanese Patent Publication Laid-Open No. 2000-112194), the transmission of the rotation from a rotary shaft to an image carrier is directly linked to a large gear connected via a fitting member, and a shaft bearing thereof having a coupling form into which a fitting section of the fitting member fits. It claims that with such a configuration, the rotation may be slowed down with the one large gear from a main motor to the image carrier, allowing the reduction of the number of gear teeth to decrease the influence of the accumulated tolerances and improve the rotation irregularities, so that the image carrier can follow the rotation irregularities of an intermediate transfer body.

However, the rotation irregularities could be improved but not be sufficiently small, and the image carrier could not follow the rotation irregularities of the intermediate transfer body and image defects sometimes occurred in the color image forming apparatus.

Further, when connecting the image carrier and the drive section with couplings, a state in which an image-carrier side coupling and a drive section side coupling abut each other at only one place (wherein referred to as one-point abutment) occurs, causing the generation of the rotation irregularities. The rotation irregularities due to this one-point abutment may be a factor that is preventing the image carrier from following the surface velocity of the intermediate transfer body.

To cope with the above problem, the applicant proposes, in Unexamined Japanese Patent Application No. 2005-62806 (corresponding to Japanese Patent Application No. 2004-43817), a configuration that provides play in a connection section of the couplings so that the couplings can be abutted at several places due to this play. With this configuration, the one-point abutment can be prevented with considerable probability.

SUMMARY OF THE INVENTION

An image forming apparatus includes: an image carrier rotated by a drive section and carrying a toner image to transfer onto a medium to be transferred; and a drive-side coupling and an image carrier-side coupling that are capable of being connected to and being separated from each other by the relative movement in the direction of a rotary shaft of the drive section and capable of connecting and separating the drive section and the image carrier. The drive-side coupling has a plurality of abutting surfaces for transmitting a driving force from the drive section, the image carrier-side coupling has a plurality of abutting surfaces to which the driving force is transmitted, and the drive-side coupling and the image carrier-side coupling have differences in angles of each of the abutting surfaces of the couplings with respect to the direction in which the couplings are connected to and separated from each other.

BRIEF DESCRIPTION OF THE DRAWINGS

FIGS. 5(a) through 5(c) are views of the drive-side coupling, wherein FIG. 5(a) is a front view seen from the axial direction, FIG. 5(b) is a side view, and FIG. 5(c) is a cross sectional view taken along the line 5(c)-5(c) of FIG. 5(a);

FIGS. 6(a) through 6(c) are views of the image carrier-side coupling, wherein FIG. 6(a) is a front view seen from the axial direction, FIG. 6(b) is a side view, and FIG. 6(c) is a cross-sectional view taken along the line 6(C)-6(C) of FIG. 6(a);

FIGS. 7(a) and 7(b) are views schematically showing the state in which the drive-side coupling and the image carrier-side coupling are connected to each other, wherein FIG. 7(a) is a side view and FIG. 7(b) is a front view;

DETAILED DESCRIPTION OF THE PREFERRED EMBODIMENT

An embodiment of the present invention will be described with reference to the drawings below.

Figure 1:
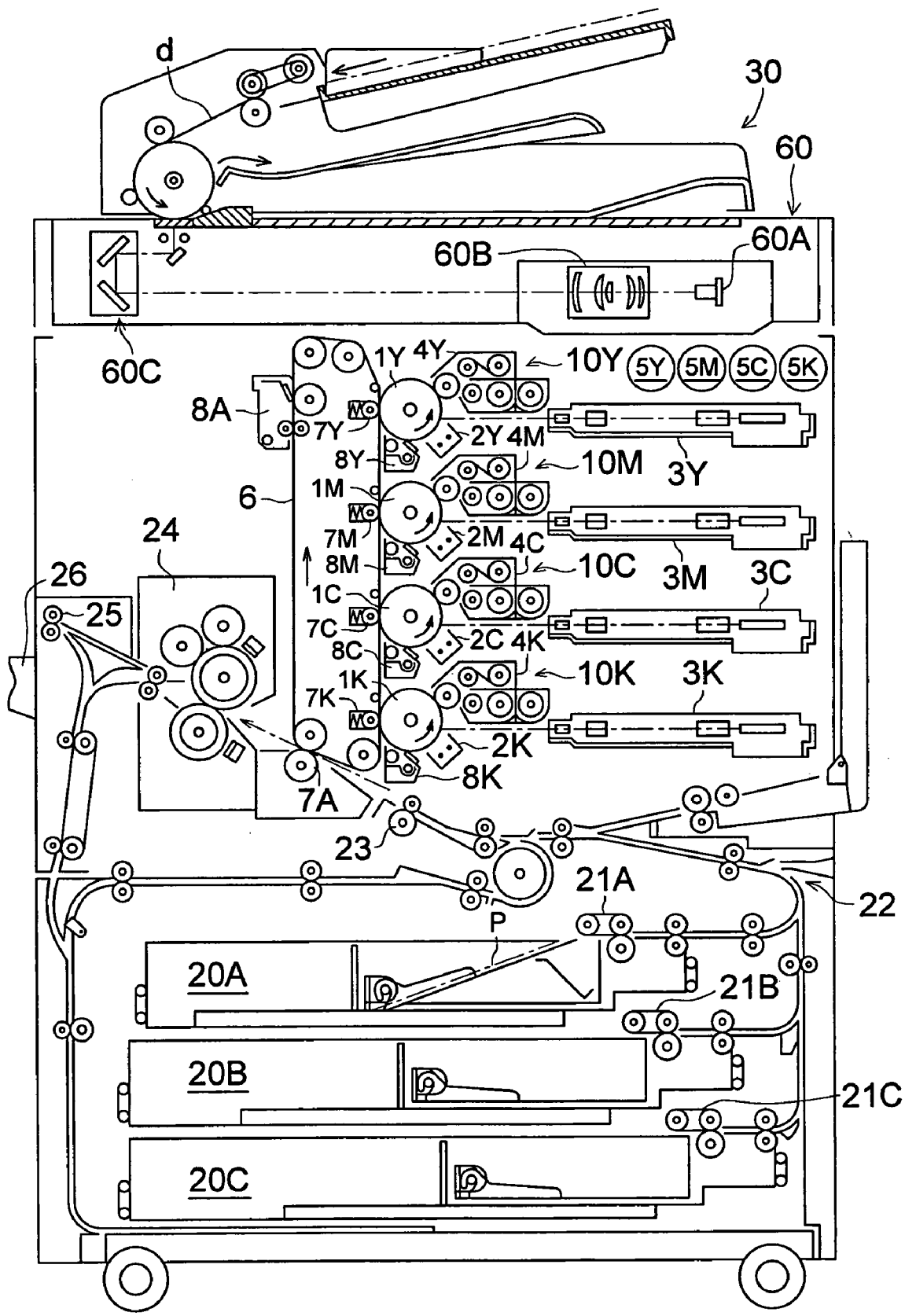
FIG. 1 is a view showing a color image forming apparatus according to an embodiment of the present invention.

FIG. 1 is a view showing a color image forming apparatus according to an embodiment of the present invention. The color image forming apparatus shown in FIG. 1, which is called a tandem type color image forming apparatus, has an automatic document feeder 30, an image reader 60, image writers 3Y, 3M, 3C, 3K, image carriers 1Y, 1M, 1C, 1K, electric chargers 2Y, 2M, 2C, 2K, developing devices 4Y, 4M, 4C, 4K, a fixing device 24, a belt-like intermediate transfer body 6 as a medium to be transferred, paper feeding units 21A, 21B, 21C, a conveyance system 22 and the like.

The automatic document feeder 30 is a device for automatically conveying two-sided or one-sided documents d. The image reader 60 is a device from which image information is read with a moveable optical system, and reads the contents of many sheets of documents d fed from a document loading board by reflecting the contents with three movable mirrors 60C and forming an image on an image sensor 60A composed of a CCD through a collective lens 60B.

An image forming section 10Y for forming an image of the yellow color has the electric charger 2Y disposed around the image carrier 1Y as an image forming body, the image writer 3Y, the developing device 4Y and a cleaning device 8Y. An image forming section 10M for forming an image of the magenta color has the image carrier 1M as an image forming body, the electric charger 2M, the image writer 3M, the developing device 4M and a cleaning device 8M. An image forming section 10C for forming an image of the cyan color has the image carrier 1C as an image forming body, the electric charger 2C, the image writer 3C, the developing device 4C and a cleaning device 8C. An image forming section 10K for forming an image of the black color has the image carrier 1K as an image forming body, the electric charger 2K, the image writer 3K, the developing device 4K and a cleaning device 8K. The electric charger 2Y and the image writer 3Y, the electric charger 2M and the image writer 3M, the electric charger 2C and the image writer 3C, and the electric charger 2K and the image writer 3K, respectively, constitute a latent image forming section.

The intermediate transfer body 6 is an endless belt which is extended and rotatably supported by a plurality of rollers. In the configuration as described above, the image forming sections 10Y, 10M, 10C, 10K and the intermediate transfer body 6 configure a process cartridge that can be pulled out from the image forming apparatus main body. Image carrier units are composed of the image carriers 1Y, 1M, 1C, 1K and the electric chargers 2Y, 2M, 2C, 2K corresponding to each of the image carriers. When the process cartridge is pulled out, the image carrier units and the developing devices 4Y, 4M, 4C, 4K can be attached to and removed from the process cartridge.

A signal of the information of an image formed on the image sensor 60A is transmitted to an image processing section (not shown). The image processing section carries out analog processing, A/D conversion, shading correction, image compression processing or other processing, and then transmits the signals of each of the colors to the image writers 3Y, 3M, 3C, 3K respectively.

In the image writers 3Y, 3M, 3C, 3K, using a semiconductor laser as a laser beam source, a light beam the semiconductor laser has irradiated is formed into a scanning beam by an optical element such as a polygon mirror, entering the image carriers 1Y, 1M, 1C, 1K as scanning bodies to form electrostatic latent images of the respective colors.

The images of the respective colors formed by the image forming sections 10Y, 10M, 10C, 10K are sequentially transferred onto the rotating intermediate transfer body 6 by transfer devices 7Y, 7M, 7C, 7K as primary transfer devices (primary transfer), so that a synthesized color image is formed. Recording papers P, accommodated in paper feeding cassettes 20A, 20B, 20C, are fed by paper feeding unit 21A, 21B, 21C, conveyed to a transfer device 7A as a secondary transfer device by matching the timing in registration rollers 23 via the conveyance system 22, and color images are transferred onto the recording papers P (secondary transfer). The recording paper P with the color image transferred thereon is subjected to fixing processing by the fixing device 24, held between paper delivery rollers 25, and placed on a paper delivery tray 26 outside the apparatus.

On the other hand, the intermediate transfer body 6, which separated the recording paper P after having transferred the color image on the recording paper P by the transfer device 7A, is cleaned by a cleaning device 8A.

Reference numerals 5Y, 5M, 5C, 5K denote toner supplying units for supplying new toner to the developing devices 4Y, 4M, 4C, 4K, respectively.

Figure 2:
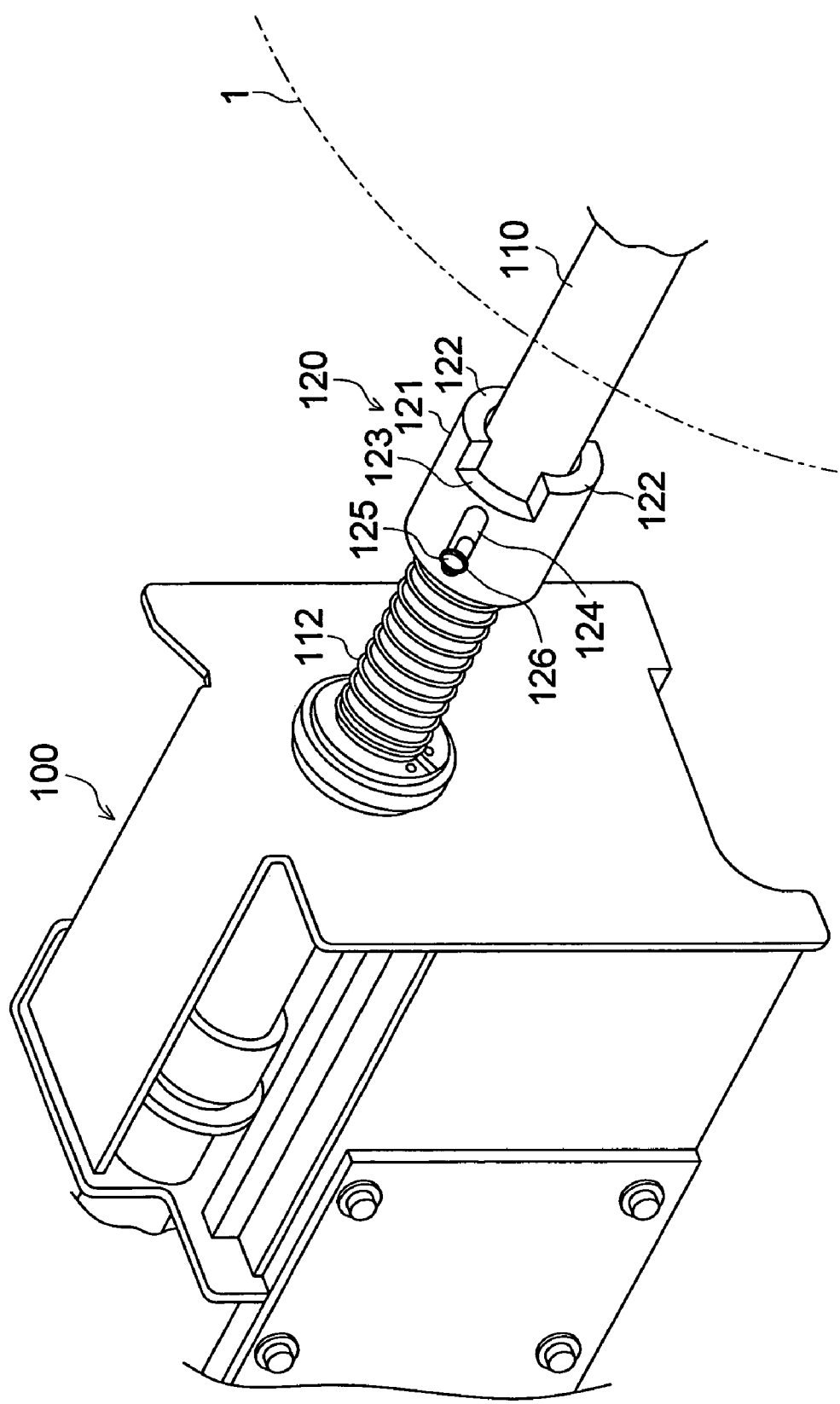
FIG. 2 is a perspective view showing from a drive section of an image carrier to a drive-side coupling.
Figure 3:
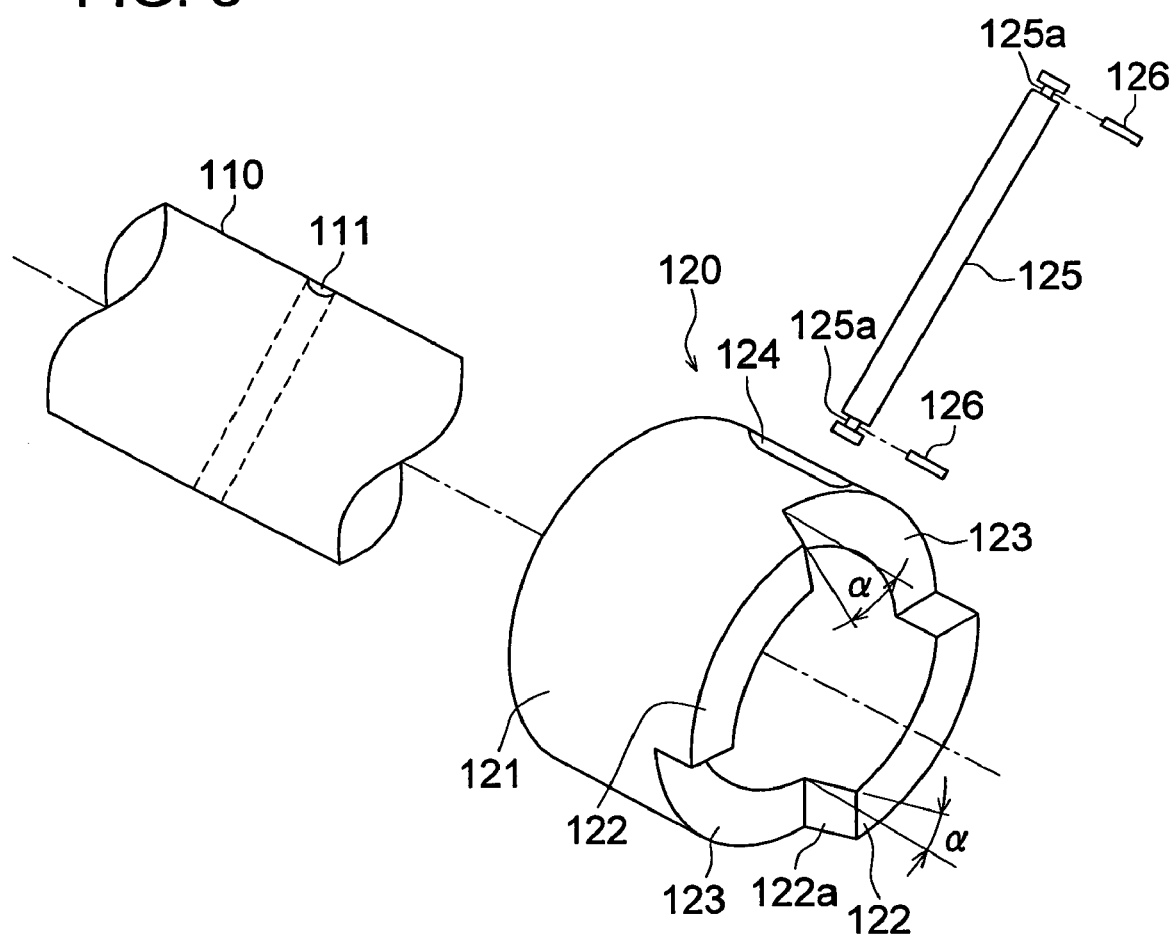
FIG. 3 is an exploded perspective view of peripheral parts of the drive-side coupling in FIG. 2, which is seen from a slightly different angle.

FIG. 2 is a perspective view shown from the drive section of the image carrier 1 (which is assumed to indicate either of 1Y, 1M, 1C, or 1K) to the drive-side coupling. FIG. 3 is an exploded perspective view of the peripheral parts of the drive-side coupling in FIG. 2, which is seen from a slightly different angle. The drive section 100 accommodates a train of teeth therein, and transmits the slowed down rotation to a rotary shaft 110 by a main motor not shown. The drive section 100 is fixed in the image forming apparatus main body, and the rotary shaft 110 is a cantilever beam with an end thereof supported by the drive section 100.

A drive-side coupling 120 is attached to the rotary shaft 110. In an end-side of a hollow cylindrical section 121 of the drive-side coupling 120, two convex sections 122, 122, protruding in the axial direction, are formed facing each other, and two concave sections 123, 123 are formed between these convex sections 122, 122. In the hollow cylindrical section 121, a long hole 124 extending in the axial direction is formed penetrating therethrough. In the rotary shaft 110, a penetration 111 is made so as to be overlapped with the long hole 124. The drive-side coupling 120 is inserted from the top end of the rotary shaft 110, and the long hole 124 and the penetration 111 are overlapped with each other. Next, both ends of a pin 125 to be inserted through the penetration 111 protrude in both sides of the drive-side coupling 120. When the positions of grooves 125a, 125a in both sides of the pin 125 are set to be substantially the same height as the peripheral surface of the hollow cylindrical section 121 and E rings 126, 126 are fit into the grooves 125a, 125a, the drive-side coupling 120 is engaged in the rotary shaft 110 as shown in FIG. 2.

A coil spring 112 is put in the rotary shaft 110 before the drive-side coupling 120 is inserted, so that, when the drive-side coupling 120 is fit into an image carrier-side coupling 130, the rotary shaft 110 is energized to maintain the connection of both couplings 120, 130.

Figure 4:
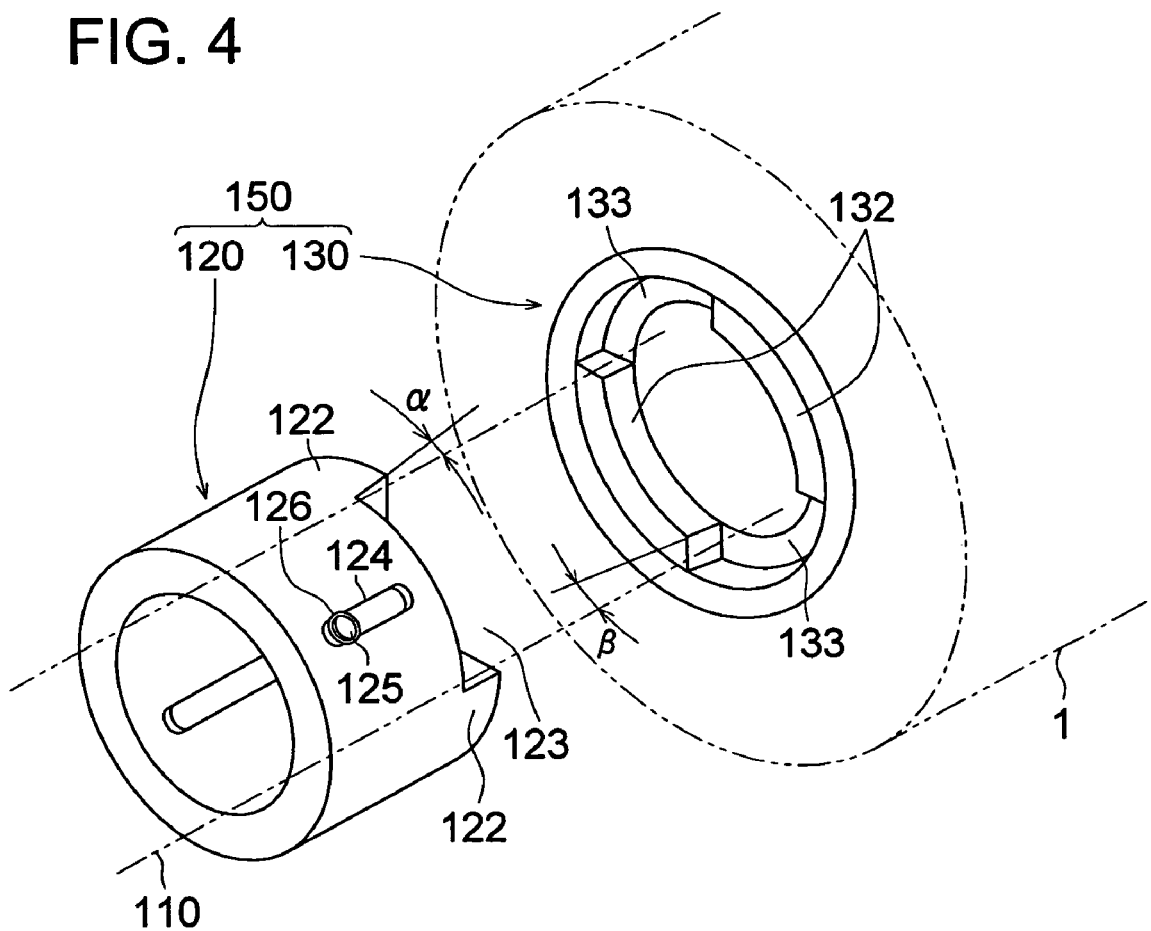
FIG. 4 is a perspective view showing the state before fitting a coupling constituted by the drive-side coupling and an image carrier-side coupling.

FIG. 4 is a perspective view showing the state before fitting a coupling 150 comprising the drive-side coupling 120 and the image carrier-side coupling 130. The rotary shaft 110 is indicated by virtual lines to make the configuration of the image carrier-side coupling 130 easily understandable.

The image carrier-side couplings 130 made of metal are fit into both ends of the cylindrical image carrier 1 to form an integrated unit and having a form complementing the drive-side coupling 120. In other words, the image carrier-side coupling 130 includes two convex sections 132, 132 and two concave sections 133, 133 which are formed between the convex sections 132, 132. The convex sections 132, 132 are loosely fitted into the concave sections 123, 123 of the drive-side coupling 120, and the convex sections 122, 122 of the drive-side coupling 120 are loosely fitted into the concave sections 133, 133.

Figure 5:
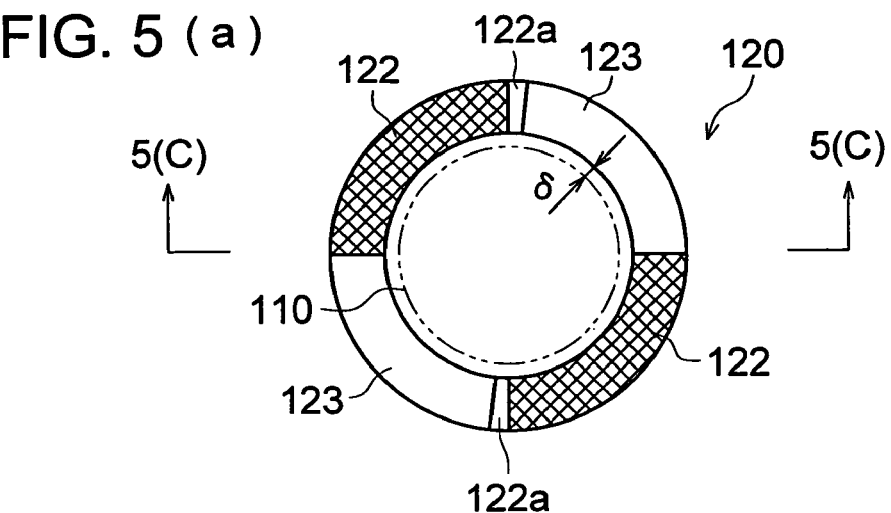
Figure 5:
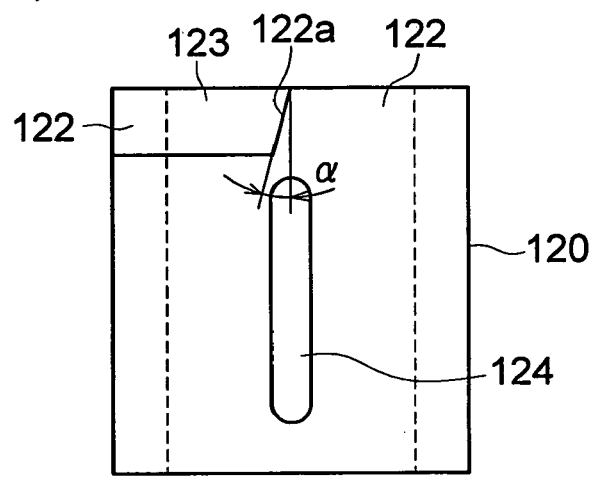
Figure 5:
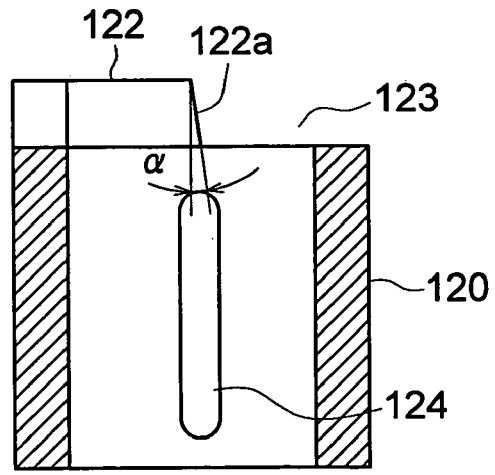

FIGS. 5(a) through 5(c) are views of the drive-side coupling 120, wherein FIG. 5(a) is a front view seen from the axial direction, FIG. 5(b) is a side view, and FIG. 5(c) is a cross-sectional view taken along the line 5(c)-5(c) of FIG. 5(a). As shown in the figures, the drive-side coupling 120 has a cylindrical form and includes the two convex sections 122, 122 and the concave sections 123, 123 formed between the convex sections 122, 122. In FIG. 5(a), the top faces of the convex sections 122, 122 are indicated by cross-hatching to make them easily understandable. Further, one side face of each of the convex sections 122, 122 is an abutting surface 122a which is a slant face of an angle $\alpha$ relative to the direction in which the coupling 150 is connected and separated (the same direction as the rotary shaft 110).

The rotary shaft 110, which is indicated by the virtual lines, is loosely fitted into the drive-side coupling 120 with a clearance $\delta$ around the entire circumference. This clearance enables the connection section to have play in the state in which the coupling 150 is connected.

Further, the drive-side coupling 120 made of metal is manufactured by molding in the embodiment, in which the angle $\alpha$ is also served as a draft angle. It is to be noted that the drive-side coupling 120 is not limited to manufacture by molding, and may be manufactured by cutting.

Figure 6:
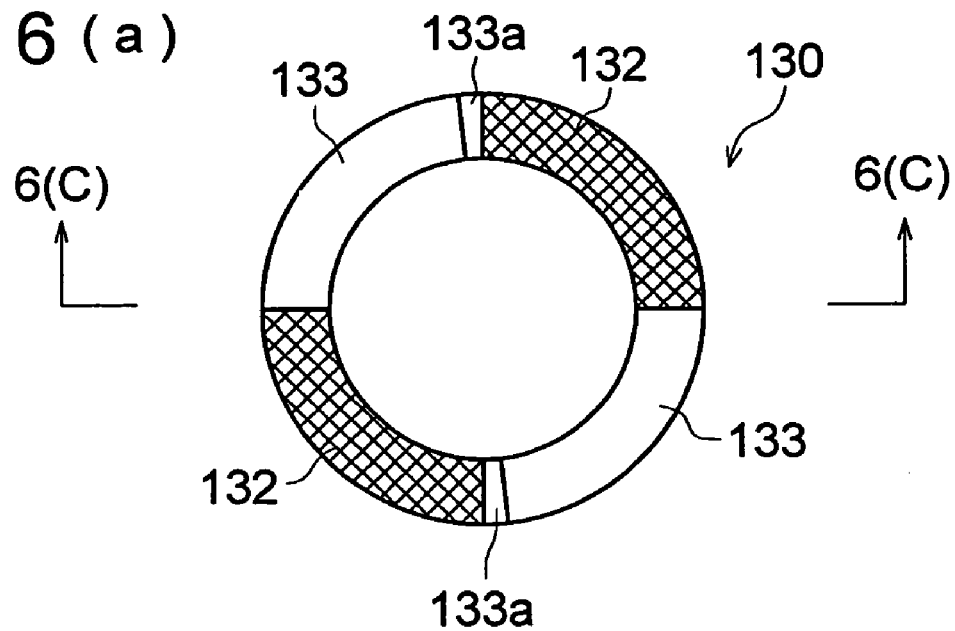
Figure 6:
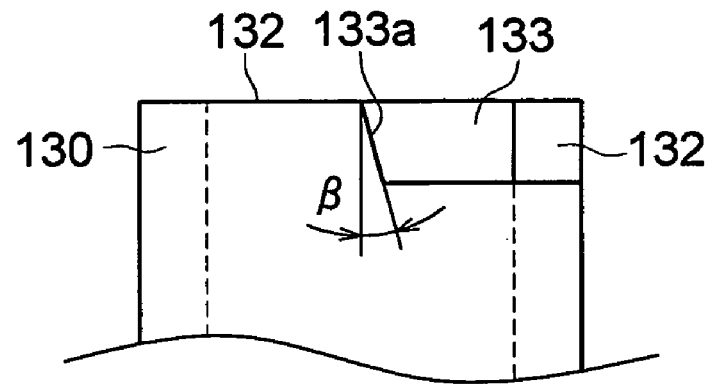
Figure 6:
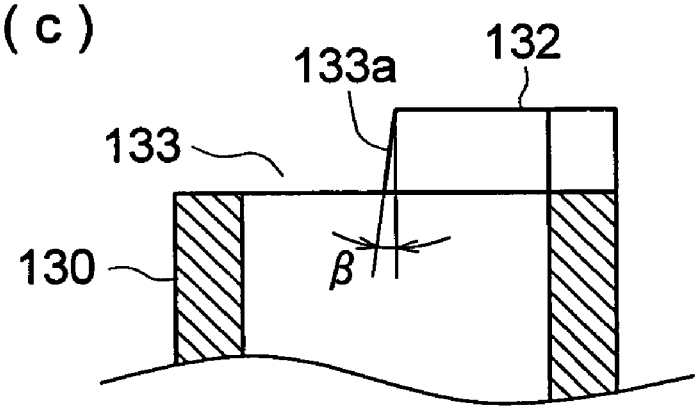

FIGS. 6(a) through 6(c) are views of the image carrier-side coupling 130, wherein FIG. 6(a) is a front view seen in the axial direction, FIG. 6(b) is a side view and FIG. 6(c) is a cross-sectional view taken along the line 6(c)-6(c) of FIG. 6(a). As shown in the figures, the image carrier-side coupling 130 has the two convex sections 132, 132 in the cylindrical portion thereof and the concave sections 133, 133 formed between these convex sections 132, 132. In FIG. 6(a), the top faces of the convex sections 132, 132 are indicated by cross-hatching to make them easily understandable. Further, either of the side faces of each of the concave sections 133, 133 is an abutting surface 133a which is a slant face of an angle $\beta$ relative to the direction in which the coupling 150 is connected and separated.

The angle $\alpha$ of the abutting surface 122a of the drive-side coupling 120 and the angle $\beta$ of the abutting surface 133a of the image carrier-side coupling 130 are set to be $\alpha \neq \beta$.

In the state in which the process cartridge is accommodated in the image forming apparatus main body, the rotary shaft 110 penetrates through the image carrier 1 and the top end of the rotary shaft 110 is supported by a shaft bearing provided in the image forming apparatus main body. The drive-side coupling 120 and the image carrier-side coupling 130 are in the state of being fitted together. When the process cartridge is pulled out from the image forming apparatus, the rotary shafts 110 are in the state of being pulled out from the image carriers 1Y, 1M, 1C, 1K for each of the colors.

In order to fit the drive-side coupling 120 and the image carrier-side coupling 130, the top end of the rotary shaft 110 is inserted into a hole at the center of the image carrier-side coupling 130. As the process cartridge is pushed in, the rotary shaft 110 penetrates through the cylindrical image carrier 1. The convex section 122 of the drive-side coupling 120 and the convex section 132 of the image carrier-side coupling 130 are fitted together. When the coupling 150 is fitted, the top end of the rotary shaft 110 protruding from an opposite side of the image carrier 1 is fitted in and pivotally supported by the shaft bearing (not shown) which is provided in a frame. The drive-side coupling 120 moves forward and backward along the long hole 124 in the axial direction by the energized force of the coil spring 112, and thereby the coupling 150 can maintain the fitting state.

Incidentally, a switching member, such as a solenoid, may be provided in place of the coil spring 112 to connect and remove the coupling 150.

Figure 7:
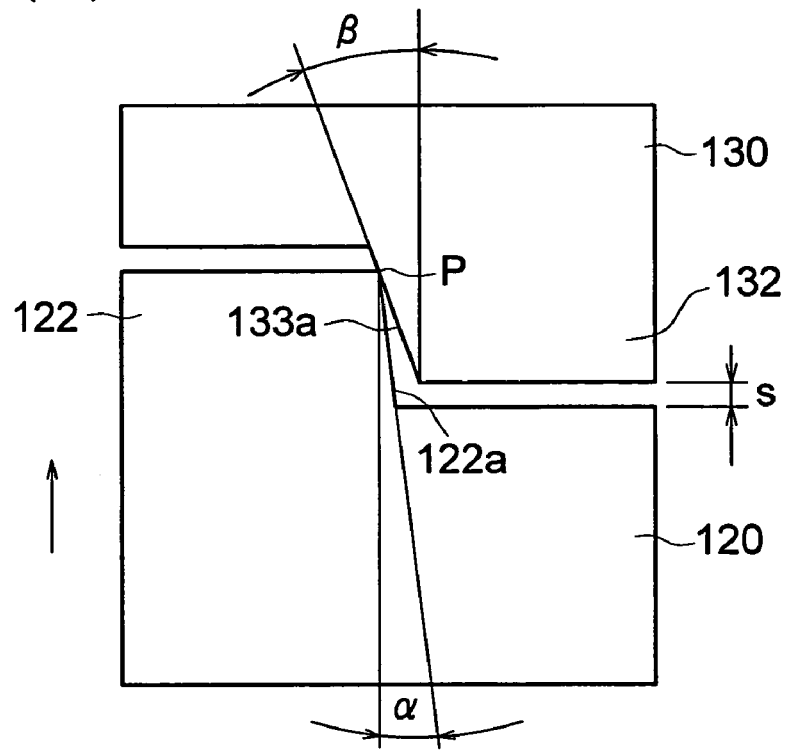
Figure 7:
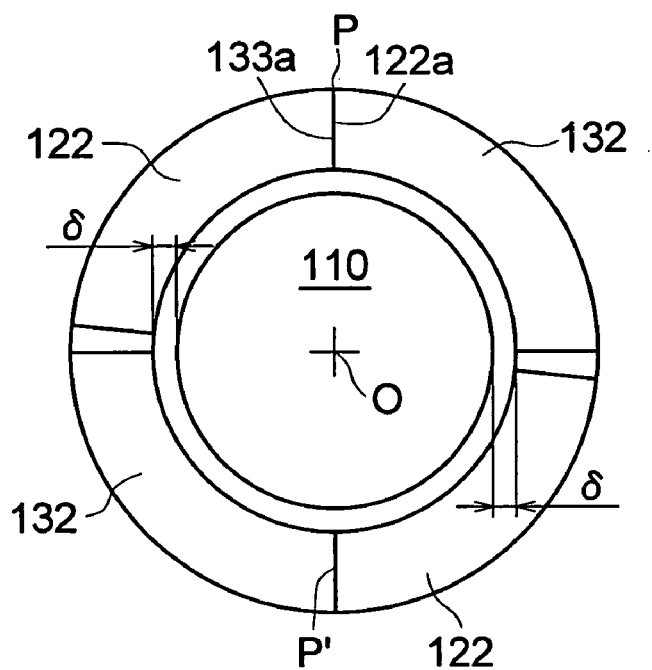

FIG. 7(a) and FIG. 7(b) are views schematically showing the state in which the drive-side coupling 120 and the image carrier-side coupling 130 are connected to each other, wherein FIG. 7(a) is a side view and FIG. 7(b) is a front view. When the drive-side coupling 120 moves in the arrow direction of FIG. 7(a) and is connected to the image carrier-side coupling 130, the abutting surface 122a and the abutting surface 133a abut each other at abutting section P. At this time, a clearance 6 should be made between the drive-side coupling 120 and the image carrier-side coupling 130.

The connection of the drive-side coupling 120 and the image carrier-side coupling 130 shown in FIG. 7(a) is in one side of the coupling 150, and the abutting surface 122a and the abutting surface 133a similarly exist in the opposite side at 180° of the coupling 150 as shown in FIG. 7(b). However, because of the influence of errors generated by the accumulation of part tolerances, including irregularities in machining precision, these two abutting surfaces do not necessarily abut each other at abutting section P' in the rear side.

In the case where the abutting surfaces 122a, 133a do not abut in the rear side, if the connection section of the coupling 150 has no play, the drive-side coupling 120 can abut at only one place of the abutting surfaces 122a, 133a in FIG. 7(a) and FIG. 7(b), which is one-point abutment. In the image carrier 1, the rotation center differs from the rotation center of the rotary shaft 110 and the coupling 150 due to a cleaning blade and dead load or other factors. When a play of the connection section of the coupling 150 is small, only one of two transmission points is used, and it happens that the rotation center moves from the rotation center of the image carrier 1, resulting in a worsening of the rotation irregularities.

Meanwhile, in an embodiment of the present invention, there is the clearance 6 between the drive-side coupling 120 and the rotary shaft 110 due to the circumstance as described above. Further, the clearance 6 is also formed between the drive-side coupling 120 and the image carrier-side coupling 130. Thus, the drive-side coupling 120 can move in the direction in which the clearance 6 becomes smaller than the state in FIG. 7(a) due to the energized force of the coil spring 112. If the abutting surface 122a and the abutting surface 133a in the opposite side are in the state of not abutting each other, the drive-side coupling 120 moves closer to the image carrier-side coupling 130 than the state in FIG. 7(a) due to the energized force of the coil spring 112, so that the abutting surface 122a and the abutting surface 133a in the opposite side may also abut each other at abutting section P' as shown in FIG. 7(b). With this feature, abutting is assured in several places, and the one-point abutment can be prevented.

The angle $\alpha$ of the abutting surface 122a of the drive-side coupling 120 and the angle $\beta$ of the abutting surface 133a of the image carrier-side coupling 130 are set to $|\alpha-\beta| \geqq 1°$ in the embodiment. The reason for setting the angle difference equal to or larger than 1° is as follows.

Although the drive-side coupling 120 and the image carrier-side coupling 130 may be formed by cutting, the molding may be desirable in view of cost reduction. Manufacturing by molding requires a draft angle, and the slant angles $\alpha$ and $\beta$ of the abutting surface 122a and the abutting surface 133a can be used as the draft angles. Further, when the couplings are manufactured by molding, the angle difference of about 0.2° through 0.3° is generated from the manufacture precision of a die due to manufacturing errors. Thus, when the difference of the angles $\alpha$ and $\beta$ is set to 0.5° or more, namely, set to the angle difference two or more times the draft angle difference due to manufacturing errors, the angles will never overlap each other.

Further, as the angle difference is $\beta>\alpha$ in the embodiment, the convex section 122 abuts the abutting surface 133a at the top end thereof, but the angle difference may be $\alpha>\beta$ so that the convex section 122 abuts the abutting surface 133a in the lower end side thereof.

In the case where there are three or more convex sections 122, 132 respectively, at least two places of the convex sections 122, 132 may be abutted.

Further, the abutting sections P, P' and a center O of the rotary shaft 110 are in the same plane, which is desirable because the rotation irregularities will be further reduced.

Figure 8:
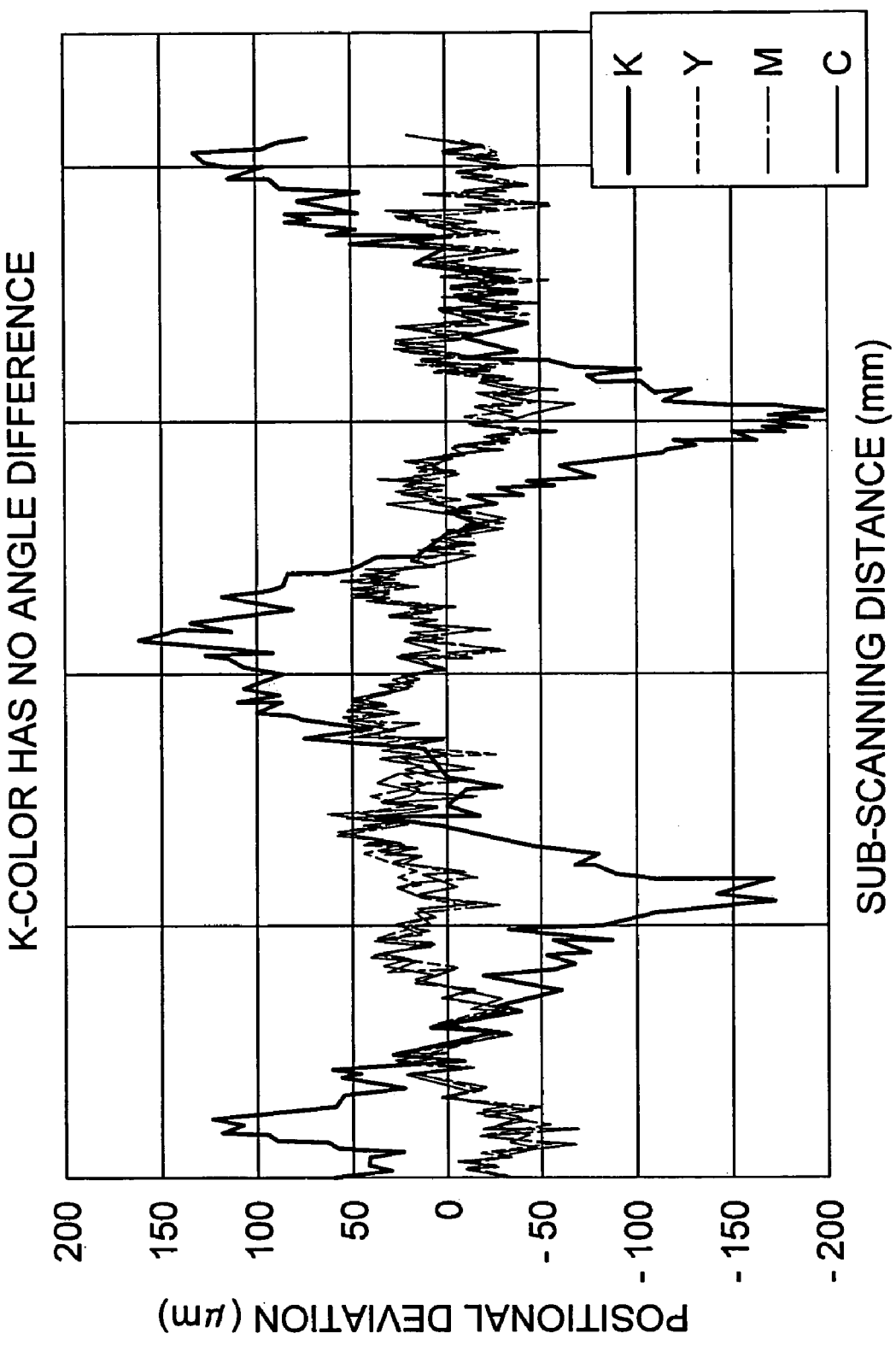
FIG. 8 is a linear view showing the positional deviation, of the four colors of Y, M, C, K, when a coupling of the present embodiment is used for the image carriers of the three colors Y, M, C, and when a coupling having no angle difference is used only for the image carrier of K.

FIG. 8 is a linear view showing the positional deviation of the images on which lines extending in the subscanning direction are recorded and output using the coupling of the present embodiment for the image carriers for the three colors Y, M, C of the four colors Y, M, C, K, and using a conventional coupling having no play and angle difference of the slant faces only for the image carrier of K. The clearance 6 was set to 50 μm. The three colors of Y, M, C in which the couplings having the play, and the slant faces with angle difference was used, vary substantially corresponding with little color registration unevenness among the colors. In other words, the image carriers 1Y, 1M, 1C could follow the rotation of the intermediate transfer body 6 within small errors. On the other hand, 1K could not follow the rotation of the intermediate transfer body 6 with large color registration unevenness.

Figure 9:
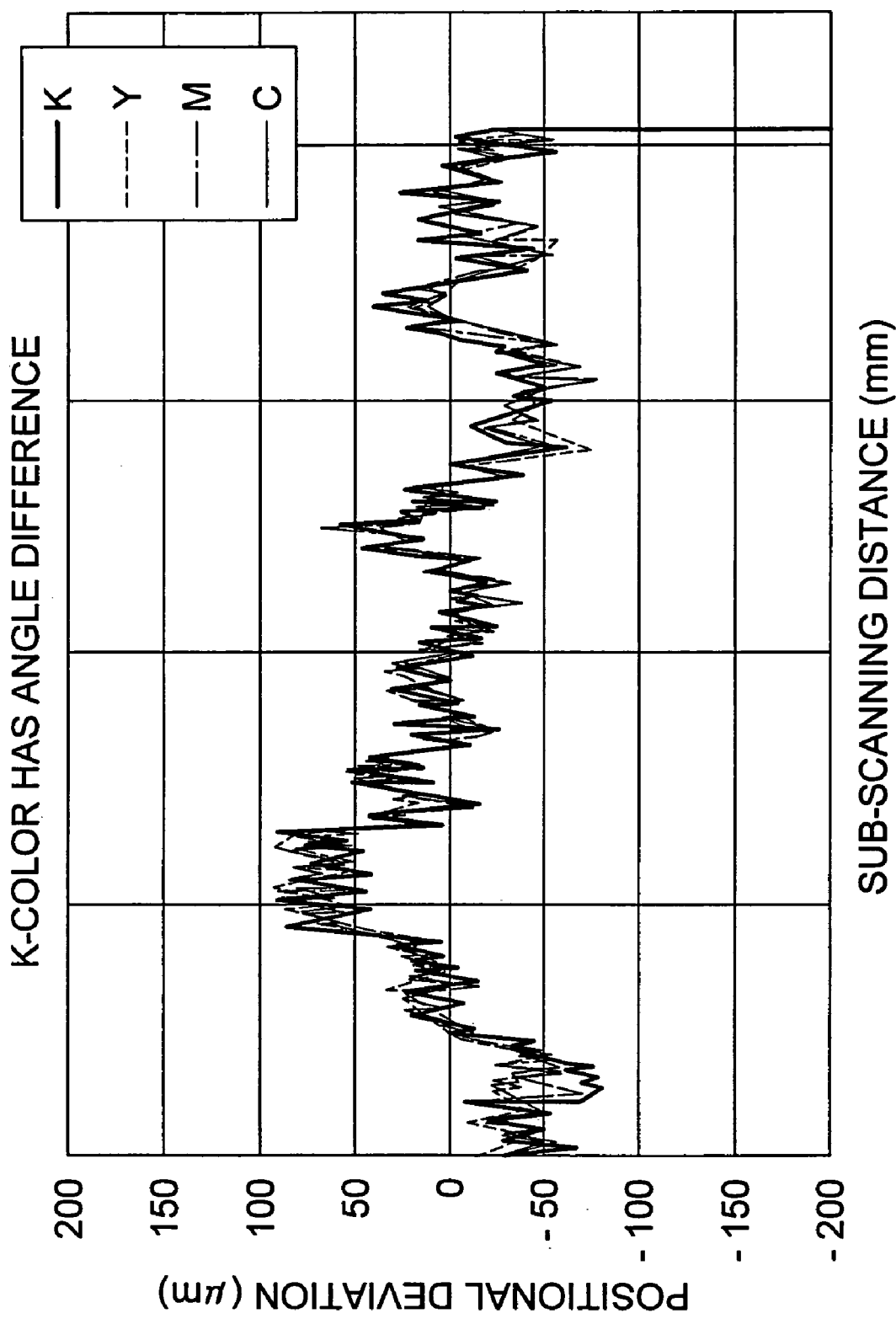
FIG. 9 is a liner view showing the positional deviation when the coupling of the present invention is used in the image carriers of all of the four colors.

FIG. 9 is the case where the coupling having the play like in the other colors and equipped with the abutting surfaces with the angle difference is also attached to the image carrier 1K of K. It can be seen that the four colors of Y, M, C, K could follow the rotation of the intermediate transfer body 6 with correspondence.

In the case where the image forming apparatus is monochrome, the intermediate transfer body 6 is substituted by a transfer paper as the medium to be transferred, and when the abutting surfaces are not nonparallel like the coupling 150 in the conventional technology, the one-point abutment occurs with the rotation irregularities generated in the image carrier 1, which has caused the image defects. Meanwhile, the present invention could suppress the rotation irregularities of the image carrier 1, so that the image carrier 1 could rotate keeping a constant linear velocity, and the image defects in monochrome could be reduced.

In the case of the conventional color image forming apparatus, when the image carrier 1 is transferring a toner image while closely contacting the medium to be transferred, such as the intermediate transfer body 6, because the conventional coupling has no play, the rotation irregularities may easily occur in the image carrier and displacement is generated between the image carrier 1 and the intermediate transfer body 6 during the transfer, which has caused the image defects. On the other hand, in the coupling 150 of the present invention, abutting can be assured at several points, so that the surface velocities of the image carrier 1 and the intermediate transfer body 6 are highly identical to each other, and the image registration failure can be made smaller.

Incidentally, assuming that the intermediate transfer body 6 is an image carrier, the coupling 150 of the present invention may be used in the drive section of the intermediate transfer body 6. The use of the coupling 150 in the intermediate transfer body 6 allows the surface velocity irregularities in the intermediate transfer body 6 to be reduced, whereby also the image defects may be improved. Further, in the case of the color image forming apparatus, it is needless to say that the intermediate transfer body 6 may be substituted by the transfer paper as the medium to be transferred.

Further, with the connection having play as described above, the coupling 150 will be easily assembled. In addition, the configurations of the drive-side coupling 120 and image carrier-side coupling 130 described in the embodiment are simple, so that the manufacturing cost is low and the assembly is easy.

Further, the engagement of the convex sections 122 and the concave sections 133 are exemplified as the connection configurations of the coupling, but not limited to these embodiments.

Further, the rotary shaft 110 may exist in either of the drive-side coupling 120 or the image carrier-side coupling 130, and does not need to penetrate through both of them.

In the present invention, it is important that the slant angles of the abutting surfaces are different and the abutting surfaces can abut at two places. While the above embodiment has the configuration in which the fitting of the drive-side coupling 120 and the rotary shaft 110 is loose fitting, the embodiment is not limited to this configuration.

When the rotation of a motor or the like is transmitted to an image carrier via a gear train or the like, the drive section side such as the motor and the image carrier are connected by couplings. Formed in the drive-side coupling and the image carrier-side coupling are a plurality of abutting surfaces respectively, and when the drive-side coupling and the image carrier-side coupling move in the axial direction to be connected to each other, one of the plurality of abutting surfaces first abuts the abutting surface of the opposed coupling at one place. The couplings further move and can abut another abutting surface at some place, or at a second place. With this feature, the one-point abutment is eliminated and the rotation in the drive-side is precisely transmitted to the driven-side, so that the rotation irregularities can be reduced.

The coupling having play can easily abut at the second place as described above. The play of the couplings may be configured that a hollow cylindrical section is provided in either of the couplings, in which the rotary shaft is loosely fit. As for the abutting surfaces of the couplings, a plurality of protrusions are formed in either of the couplings, and concave sections in which the protrusions fit are formed in the other coupling, and the side faces of the protrusions and the concave sections are used as the abutting surfaces.

The two abutting surfaces may not be both parallel to the rotary shaft. In this case, when the difference of the slant angles of both abutting surfaces is equal to or larger than 0.5°, the angle difference can be maintained in spite of the influence of manufacturing errors in the slant angles. When the coupling is a molded product, the slant faces can be converted to the draft angles.

The present invention has the configuration that, in an image forming apparatus for transmitting the rotation of a drive section to an image carrier, the drive section and the image carrier are connected by couplings, the couplings each having a plurality of abutting surfaces for transmitting a drive force as well as having an angle difference in angles of two abutting surfaces to abut each other in the direction where the couplings are connected and separated, allowing prevention of the one-point abutment, reduction of the rotation irregularities of the image carrier, and equalization of the surface velocities in the image carrier and the medium to be transferred, so that an image with little defects can be obtained.

In the case where the color image forming apparatus having a plurality of image carriers, toner images of the respective colors can be precisely superimposed on the medium to be transferred, so that a color image without color registration failure can be obtained.

What is claimed is:

1. An image forming apparatus comprising:
   an image carrier rotated by a drive section and carrying a toner image to transfer onto a medium to be transferred; and
   a drive-side coupling and an image carrier side coupling that are capable of being connected to and being separated from each other by relative movement in an axial direction of a rotary shaft of the drive section and capable of connecting and separating the drive section and the image carrier,
   wherein the drive-side coupling has a plurality of abutting surfaces for transmitting a driving force of the drive section, the image carrier-side coupling has a plurality of abutting surfaces to which the driving force is transmitted, and the drive-side coupling and the image carrier-side coupling have a difference in angles of each of the abutting surfaces of the couplings with respect to a direction in which the couplings are connected to and separated from each other,
   wherein the rotary shaft with which at least one of the couplings is engaged is loosely fitted into a hollow cylindrical section to form a clearance between entire circumferential surfaces of the rotary shaft and the hollow cylindrical section, and
   wherein, when the couplings are connected, a clearance is formed between the drive-side coupling and the image carrier-side coupling in the axial direction of the rotary shaft.

2. The image forming apparatus of claim 1, wherein each of one of the abutting surfaces of the drive-side coupling and the abutting surfaces of the image carrier-side coupling is a side face of each of a plurality of convex sections formed on each of one of the couplings and provided parallel to the direction of the rotary shaft, each of the other of the abutting surfaces of the drive-side coupling and the abutting surfaces of the image carrier-side coupling is a side face of each of a plurality of concave sections formed on each of the other of the couplings, and the couplings are connected to each other by making the plurality of convex sections to be loosely fitted to the plurality of concave sections.

3. The image forming apparatus of claim 1, wherein the difference of the angles of each of the abutting surfaces of the couplings is 0.5° or more.

4. The image forming apparatus of claim 1, wherein at least one of the couplings is an article manufactured by molding using a die, and the angle of the abutting surfaces of the at least one of the couplings manufactured by the molding is also served as a draft angle to draw the article from the die.

5. The image forming apparatus of claim 1, wherein the image carrier comprises a plurality of image carriers, and the medium to be transferred is an intermediate transfer body on which each toner image of the plurality of image carriers is transferred and superimposed.

6. The image forming apparatus of claim 5, wherein the intermediate transfer body and the plurality of image carriers constitute at least a part of a process cartridge, and each of the image carrier-side couplings of the plurality of image carriers and each of the drive-side couplings corresponding to the image carrier-side couplings are connected to and separated from each other responsive to an attachment or removal operation of the process cartridge with respect to a main body of the image forming apparatus.

* * * * *